United States Patent
Timmons et al.

(10) Patent No.: US 7,296,992 B2
(45) Date of Patent: Nov. 20, 2007

(54) MULTIPLE LAYER COMBINING ADAPTER

(75) Inventors: Anton L. Timmons, Fulton, NY (US); Frederick C. Suppon, Fulton, NY (US); John S. Montalbano, Baldwinsville, NY (US)

(73) Assignee: Davis-Standard, LLC, Pawcatuck, CT (US)

( * ) Notice: Subject to any disclaimer, the term of this patent is extended or adjusted under 35 U.S.C. 154(b) by 565 days.

(21) Appl. No.: 10/168,842

(22) PCT Filed: Dec. 20, 2000

(86) PCT No.: PCT/US00/34567

§ 371 (c)(1), (2), (4) Date: Feb. 5, 2003

(87) PCT Pub. No.: WO01/45919

PCT Pub. Date: Jun. 28, 2001

(65) Prior Publication Data

US 2003/0209825 A1    Nov. 13, 2003

Related U.S. Application Data

(60) Provisional application No. 60/172,950, filed on Dec. 21, 1999.

(51) Int. Cl.
*B05B 1/14* (2006.01)
*B29C 47/16* (2006.01)

(52) U.S. Cl. .............. 425/382.4; 137/561 A; 239/553.5; 239/562; 239/590.5; 425/461; 425/466

(58) Field of Classification Search .............. 425/145, 425/382.4, 460, 461, 462, 463, 464, 465, 425/466, 467, 381, 382 R; 239/552, 553.5, 239/562, 590.5; 137/561 A
See application file for complete search history.

(56) References Cited

U.S. PATENT DOCUMENTS

| | | | | |
|---|---|---|---|---|
| 4,839,131 | A | * 6/1989 | Cloeren | .................. 264/173.12 |
| 5,066,435 | A | 11/1991 | Lorenz et al. | |
| 5,169,065 | A | 12/1992 | Bloch | |
| 469,211 | A | 2/1892 | Kline | |
| 2,684,690 | A | 7/1954 | Lee | |
| 2,817,873 | A | * 12/1957 | Spang et al. | ............ 425/382 R |
| 2,864,406 | A | 12/1958 | Schewel | |
| 3,003,245 | A | 10/1961 | Nunez, Jr. | |
| 3,117,342 | A | * 1/1964 | Kopphele | ................ 425/382 R |
| 3,600,075 | A | * 8/1971 | Fairbanks | .................... 425/464 |
| 3,932,092 | A | * 1/1976 | Hureau et al. | .......... 425/382 N |
| 4,468,366 | A | * 8/1984 | Socha, Jr. | .............. 264/177.12 |
| 4,521,359 | A | 6/1985 | Tsien | |
| 4,708,615 | A | 11/1987 | Bethea et al. | |
| 4,784,815 | A | 11/1988 | Cloeren et al. | |

(Continued)

FOREIGN PATENT DOCUMENTS

| EP | 0 441 929 B1 | 1/1994 |
|---|---|---|
| EP | 0 589 567 B1 | 7/1998 |

*Primary Examiner*—Robert Davis
*Assistant Examiner*—Emmanuel S Luk
(74) *Attorney, Agent, or Firm*—Burr & Brown (57) ABSTRACT

This invention relates to the field of multiple layer plastic extrusion, and more particularly to assemblies in which thin or micro-layers of polymer material are formed which polymer material may be from two or more individual extruders, and delivered to a multilayer combining adapter in association with an extruder die or other utilizations. The combining adapter of this invention is referred to herein as a flow velocity profiler (FVP) and includes a cartridge assembly body that is formed with individual cavities that receive one of a plurality of individual precision layering inserts. Changing individual inserts is less time intensive than changing an entire body as required in prior art.

9 Claims, 7 Drawing Sheets

U.S. PATENT DOCUMENTS

| | | |
|---|---|---|
| 5,223,276 A | 6/1993 | Djordjevic et al. |
| 5,262,109 A | 11/1993 | Cook |
| 5,360,171 A | 11/1994 | Yap |
| 5,375,990 A | 12/1994 | Krupa et al. |
| 5,500,173 A | 3/1996 | Dugan |
| 5,716,650 A * | 2/1998 | Mavridis ............ 425/131.1 |

* cited by examiner

MULTIPLE LAYER COMBINING ADAPTER

CROSS-REFERENCE TO RELATED APPLICATIONS

Priority filing benefit of (1) International PCT application PCT/US00/34567 filed Dec. 21, 2000, and published under PCT 21(2) in the English language and (2) U.S. provisional application Ser. No. 60/172,950 filed Dec. 21, 1999.

BACKGROUND OF THE INVENTION

This invention relates to the field of multiple layer plastic extrusion, and more particularly to assemblies in which multiple thin or micro-layers of polymer material are formed which polymer material may be from two or more individual extruders, and delivered to a multilayer combining adapter in association with an extruder die or other utilizations operated.

Flow dividers for dividing one or more plastic polymer flows, such as from a plug type multi-layer adapter, have been employed in the co-extrusion of multi-layer films. The primary principle in the use of a flow divider includes the formation of a relatively large number of discrete polymer flow segments or layers that are then combined to form a layered structure that exhibits more uniform individual flow velocity profiles between layers.

In conventional apparatus, distortion of the layers can occur due to the rheology of the polymer material and the geometry of the flow passages. Further, in many such installations and equipment, it is necessary to place the flow divider and flow combining apparatus substantially upstream or a substantial distance from the distribution channel or manifold of the extrusion die. While some of these problems can be reduced by placing the layering and combining adapter closer to the die manifold or even in the die itself inherently, the structure of the equipment used has caused differential flow rates to occur at the combining point or region, and has caused other lack of uniformities so as to impair the quality of the multi-layer film product.

A further drawback of prior art designs resides in a difficulty of maintaining very thin skin layers. Layer uniformity with poor accuracy limits the ability to extrude thin layers of polymers with improved properties that can yield significant cost savings. Further difficulties with many of the flow dividers are the fact that they are complicated and expensive, and lack an ability to provide individual selection of flow paths and flow path areas or thicknesses without changing out and replacing an entire flow dividing block.

A need exists for an improved feed block employing a multiple layer flow combining adapter that provides more precise control of individual segments of the output from an extruder to be combined with similar outputs from one or more additional extruders in such a manner that the layer uniformity may be accurately retained, and thinner layers may be made with greater reliability.

SUMMARY OF THE INVENTION

In one aspect of the invention a converging type multiple layering feed block of novel design is connected to receive a plurality of individual polymer flows from a known extruder combining adapter of the selector pin type, such as shown at reference number 32 in U.S. Pat. No. 4,839,131 and at reference number 120 in U.S. Pat. No. 4,784,815. Such selector pin assemblies may deliver a plurality of individual polymer feeds from each of a plurality of extruders, and direct such outlet flows to selected channels, thereby permitting downstream selection of polymers and layering of channel outputs.

A feed block has an inlet side positioned to receive polymer flows from outlets defined by the selector pin assembly and directs such flows in a converging manner to a novel multiple layer combining adapter. The combining adapter feeds a layered polymer to a die manifold. A common convergence region of the feedblock may be positioned in close proximity to the entrance to a die manifold.

The combining adapter of this invention is referred to herein as a flow velocity profiler (FVP) and includes a cartridge assembly body that is formed with individual cavities that receive one of a plurality of individual precision layering inserts. The layering inserts form flow channels on opposing walls of the cavity that cooperates with a divider wall of the insert to form passageways that are converged to a common combining region beyond a narrow end of the cartridge body. The arrangement of the FVP permits the inserts to be selected or changed in such a manner that the flow along any polymer feed path to define a polymer layer may be individually controlled. Each insert divides two polymer inlet feeds, and channels the flows to a joining region while accurately metering the flows.

As an example, a cartridge designed with nine inserts can create or define eighteen individual flow channels. In such a case, each channel can represent about 5.5% of the available flow, i.e., 1/18 of the whole. The routing of polymers from a plurality of extruder to the FVP may be controlled so as to provide the desired weight of material in each of the layers by providing the desired flow to the particular channels, and by combining the flows of adjacent channels to increase the flow volume by approximately 5.5% per channel. Therefore, a first layer comprising polymer A may be designed to have a thickness of 5% and would be channeled only to the first channel where, in such example, a second layer may comprise polymer B and is designed to have a thickness of 30% and may be directed by the cartridge to channels two through six, the outlets of which combine together to form approximately 30% of the film thickness. The flow velocities and shear rates of the layers are closely matched. In this manner, the layer percentages may be varied by controlling the number of channels for each layer so that any given layer is never greater than about 2.8% from its optimum. By placing matching flow velocities of layer integrity and uniformity may be more readily and easily obtained and maintained in the extrusion die. The invention provides greater layer uniformity and improved film performance with thinner layers.

Additional benefits are improved flow streamlining, layer uniformity and the ability to stack the flow divider cartridges allows the generation of numerous ultra thin layers to improve barrier properties of common resins. The invention provides a flexibility to increase the feedblock exit width as the die width increases to improve layer uniformity. Adjustability is accomplished by adjusting the width of the flow passage of the flow divider plates in a linear fashion. This creates the effect of preferentially promoting polymer flow of the adjacent polymers toward the ends of the die. This flow divider adjustment accommodates plates for non-linear flow anomalies.

Benefits include more accurate layer uniformity, thinner layers, stackable layer cassettes to product numerous ultra thin layers, and the reproduction of layer structures including cross web uniformity.

The flow velocity profiler may be described as a flow divider/combiner including a body in the form of a block having a plurality of polymer inlets opening into a plurality of substantially identical cavities in the block. Removable inserts are positioned within the cavities. The inserts divide each cavity into at least a pair of flow passages leading from an inlet end to an outlet end, where the flows are combined. The flow characteristic of any passageway may be controlled or changed by replacing the insert with a different insert having different flow characteristics.

The invention may be further defined as a flow divider or combiner assembly, as outlined above, in which a plurality of insert cavities are arranged in a compact fan-shaped array about a center axis of flow to provide a layering assembly that may be inserted within a die to deliver a combining flow to a die manifold with a combining region adjacent the manifold inlet.

The objects and advantages provided by this invention include the following: the construction permits a greater number of layers within a smaller package; improved layer uniformity due to a shorter distance traveled by the combined polymers; improved layer uniformity due to matched velocities and shear rates at the combining regions; improved layer uniformity due to elimination of diverging flow areas in the flow path; and, interchangeable layering plates or inserts that can also be individually tailored to the polymer rheology.

In a further aspect of the invention, a flow combining block, at the inlet to the flow passages, is provided with adjustable walls or vanes by which flow width from the feedblock exit may be controlled, in a balanced manner, to create the effect of preferentially promoting polymer flow of the adjacent polymers toward the ends of the die. Such flow prediction, at the combining feedblock, can be further enhanced by shaping the flow of the divider plates for non-linear flow anomalies. Preferably, the flow of each passageway in the feed combining block selected passageways in the combining block is controlled by mutually disposed pairs of moveable dividers or blades, that are moveable together or individually, to control of the width of the flow passage in a linear fashion. This concept may be used in combination with the cartridge type feedblock assembly and combining adapter as described herein or used in combination with a more conventional combining adapter.

Other objects and advantages of the invention will be apparent from foregoing and following descriptions, and the accompanying drawings claims.

DESCRIPTION OF PREFERRED EMBODIMENT

Figure 1:
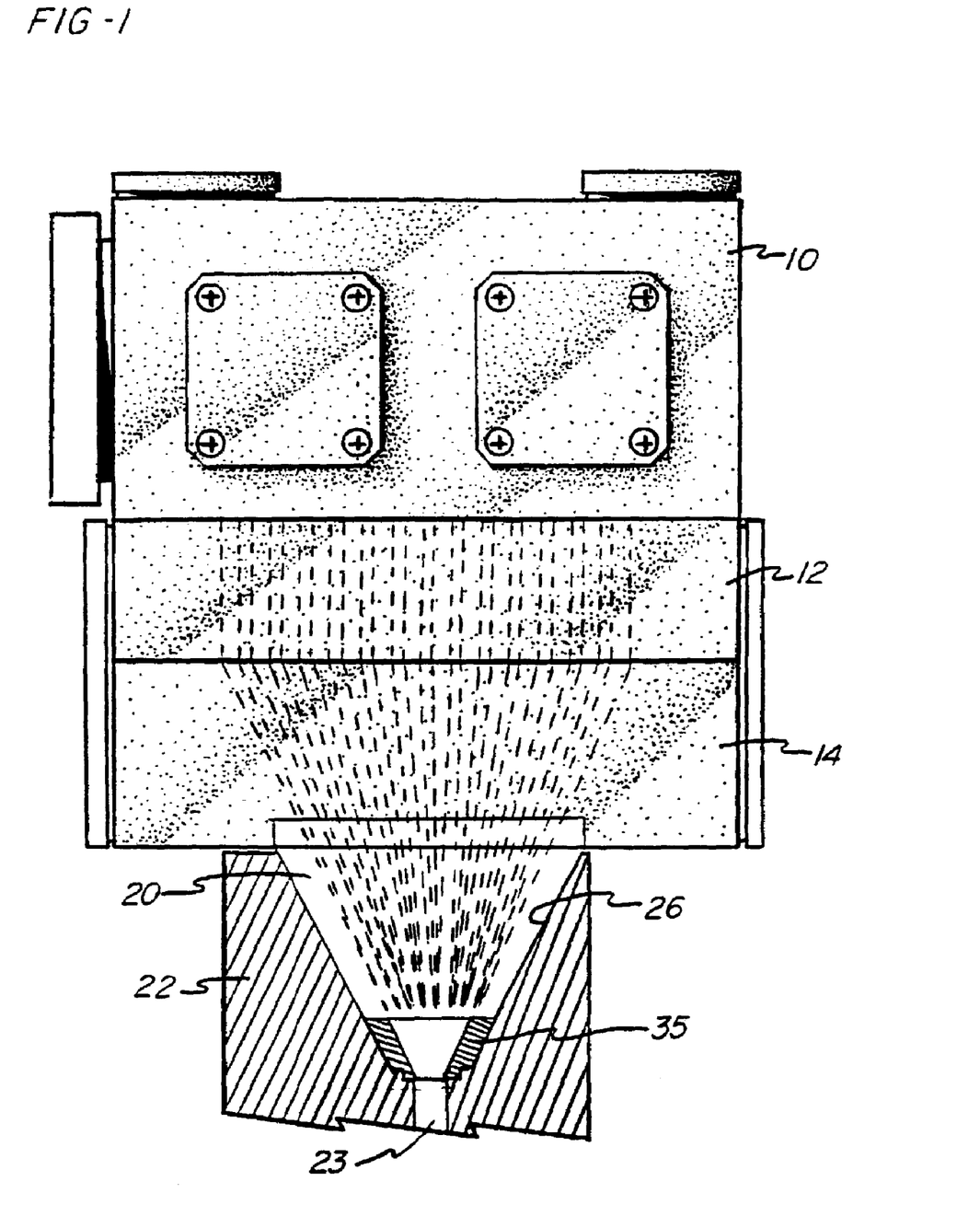
FIG. 1 is an end view of the feed block assembly of this invention including a combining adapter, for delivery of multiple flow layers of polymer materials into a die.

Referring to FIG. 1, a co-extrusion combining adapter assembly is shown including a plug type flow diverter 10. The flow diverter 10 is apparatus in which polymer flows from multiple extruders are each divided into a plurality of discrete flows exiting it at a plurality of discrete flow paths. Such a flow diverter is shown U.S. Pat. No. 4,839,131 or U.S. Pat. No. 4,784,815, previously mentioned. The flow diverter provides a plurality of feeds in generally parallel feed paths into an intermediate height adjusting block 12 for delivery, without modification, to a transitional aspect ratio block 14. The block 14 is provided with a plurality of polymer inlets, corresponding to the polymer outlets of the flow diverter 10, for delivery of the converging flows of polymer to the inlet of a flow velocity profile block 20 made in accordance with this invention.

The block 20 may be set into a recess of an extruder die 22 or other forming apparatus and accurately delivers multiple layers of extrudate to a combining region immediately or substantially immediately at the inlet 23 of a die or other utilization apparatus.

Figure 2:
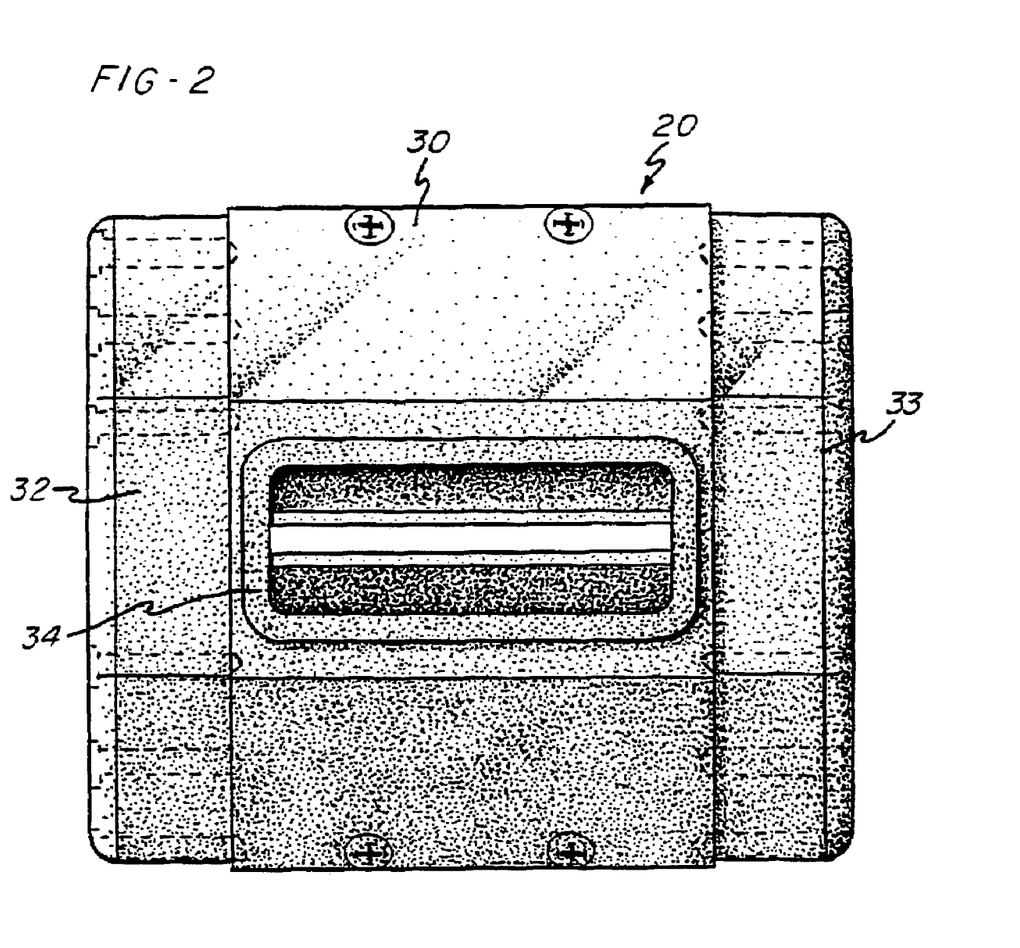
FIG. 2 is a bottom view of a flow velocity profiler block of this invention.
Figure 3:
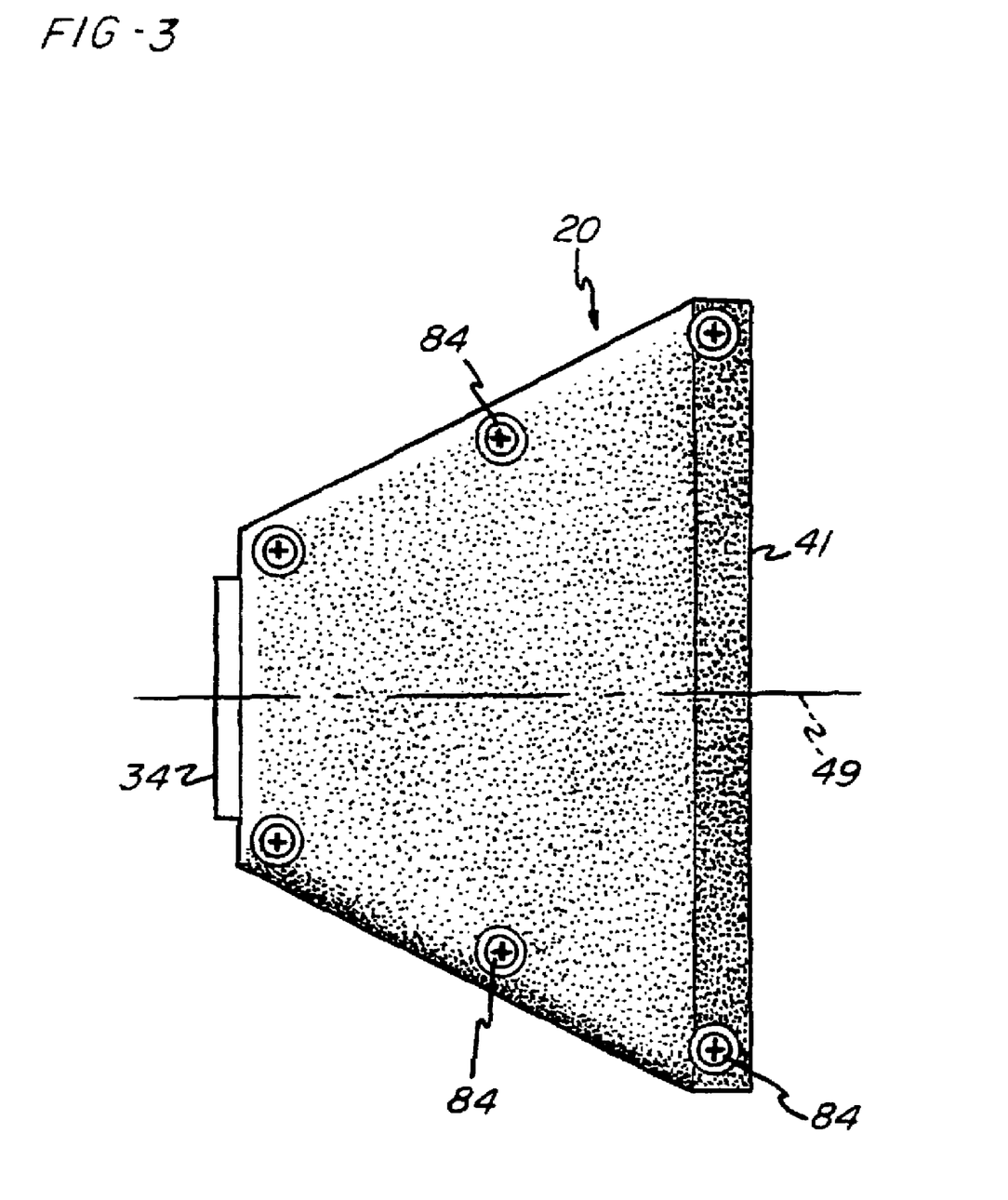
FIG. 3 is a side view of the block.
Figure 4:
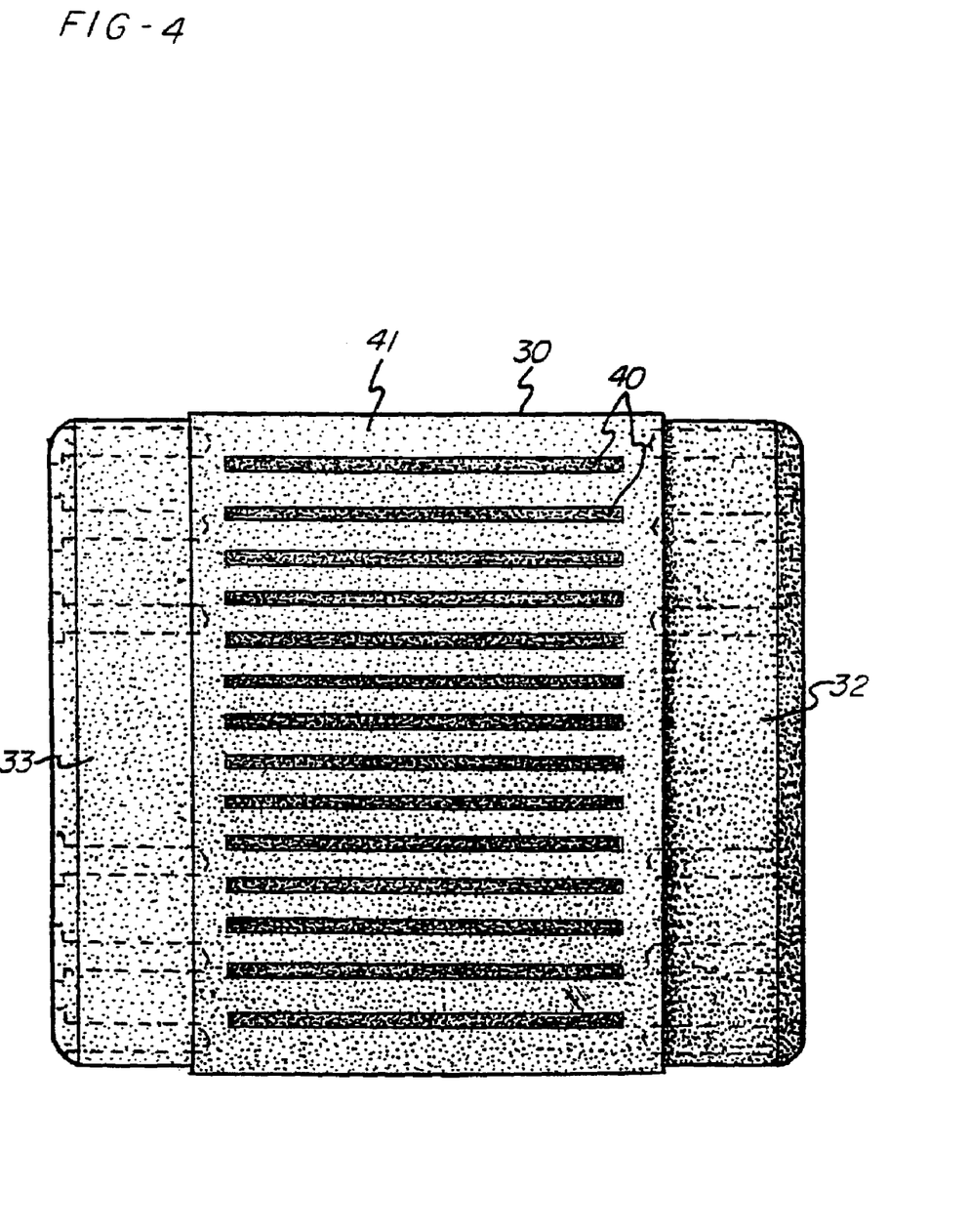
FIG. 4 is a top elevational view of the block.

The improved flow velocity profiler or block 20 of this invention is best seen in FIGS. 2-4. It is formed essentially (apart from its inserts), of three components: a central block-like cartridge body 30 having opposite side faces closed by a pair of essentially identical side plates 32 and 33. The shape of the block 20 may be likened to that of an inverted truncated pyramid with an outlet 34 at the smaller end as a final feed into a die or the like, such as the die 22.

The body 30 is provided with a plurality of parallel slot type inlets 40, as best seen in FIG. 4, at the base face or wall 41 of the adapter. These inlets are aligned with corresponding polymer passageways at the exit face of the transitional or aspect ratio block 14, FIG. 1. Also, while fourteen passageways or flow paths are shown, it will be understood that this is only illustrative of the concept, and fewer or greater number of flow passageways may be provided as known in the art, at the flow diverter 10 with corresponding suitable passageways provided in the blocks 12 and 14. The truncated end of the body 30 is in the plane of a combining region and forms a common combined outlet 34 (FIG. 5).

Figure 5:
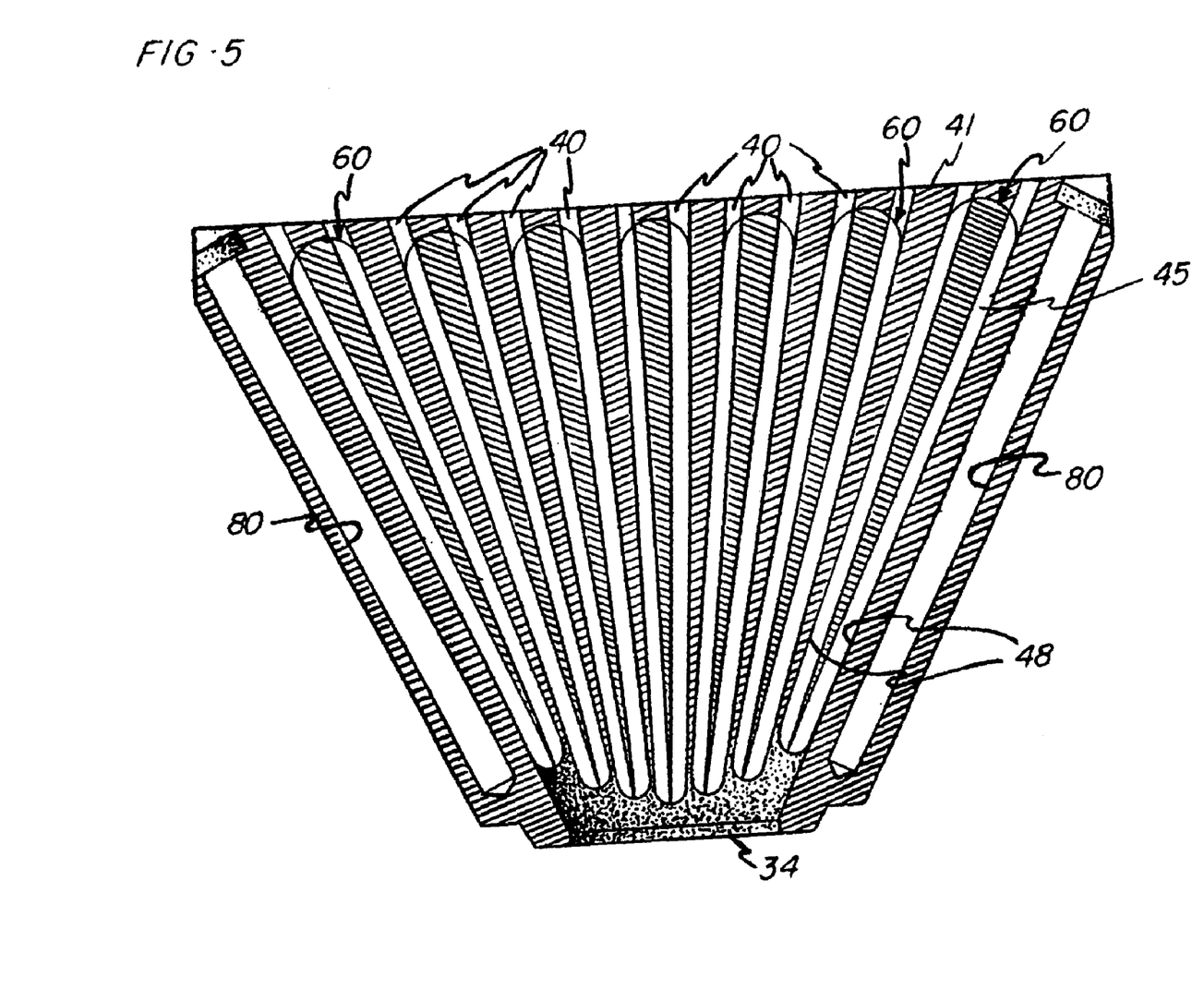
FIG. 5 is an enlarged sectional view through the FVP block of FIGS. 2-4.

When one of the side plates 32 or 33 is removed, it exposes the construction of the cartridge body 30, and this construction is shown in sectional view in FIG. 5. The inlet slots 40 are shown as being paired, two each opening into an end of an insert-receiving cavity 45. Since there are fourteen such inlets shown, seven of the cavities 45 are shown with proximal ends intercepting a pair of inlet passages 40 and with remote ends closely grouped together at the outlet 34. Each cartridge cavity 45 is identical and each is of uniform size throughout the width or thickness of the body 30. However, each cavity tapers from a maximum width at the proximal end intercepting the passageways 40 to a narrower width at the remote end, and the cavities are separated from each other by intermediate tapered walls 48 of the body 30 with the outermost cavities tapered inwardly so that their remote ends are closely grouped together immediately at the outlet 34, while the intermediate separating walls 48 terminate at pointed ends inwardly of the outlet 34.

Figure 6:
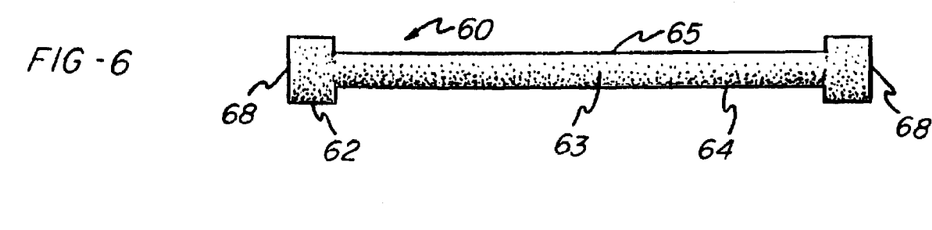
FIG. 6 is a top view of one of the cartridge inserts.
Figure 7:
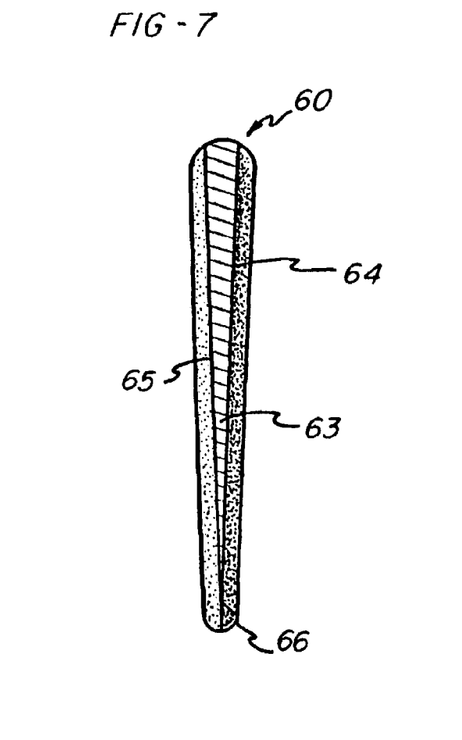
FIG. 7 is a sectional view through the insert of FIG. 6 taken generally along the line 7-7 of FIG. 8.
Figure 8:
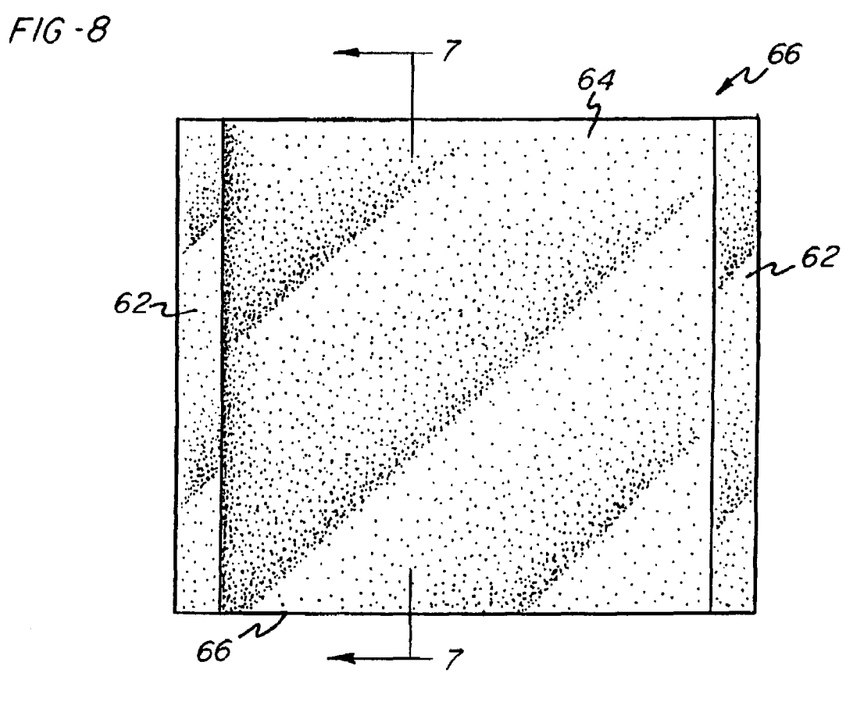
FIG. 8 is a side elevation of the cartridge insert of FIG. 6.

The cavities 45 are identical, are uniformly arranged about centerline 49, and are configured each to receive one of the precision cartridge inserts 60 as shown in FIGS. 6-8. The cartridge inserts have spaced enlarged ends or rails 62 designed to fit precisely within one of the cavities 45. Between the rails 62, material has been removed to define a center web 63 with tapering side walls 64, 65. The walls of the web 63 define, with the cartridge walls 48 and the outer cartridge walls, the passageways of precisely controlled dimensions which passageways converge along the walls 64, 65 to a joining region point 66. These joining points are in close proximity to corresponding points or terminal ends of the tapered dividing walls 48. The upper or proximal end of the web 63 is formed with a dimension which extends arcuately fully between the pair of inlet slots 40 so that the slots are fully isolated from each other by the inserts.

The cartridge inserts 60 are removably received within the cartridge body 30 by removing one or both of the side caps 32 or 33 and sliding the insert transversely of the length of the respective cavity 45. The height of the insert corresponds to the full width of the cartridge body so that the enlarged rail ends of the insert, at the outer flat surfaces 68 of the insert 60 are co-planar with the side surfaces of the cartridge body and co-planar with the adjacent enclosing surfaces of the side caps.

The insert 60 may be tailored to provide controlled flow paths through the combining adapter or may be made identical so that layer thicknesses can be controlled by combining polymer flows at the combining adapter, as required. Where fourteen such flow paths are shown, as in the drawings, each passageway defined between the insert and one of the confining walls of the cartridge body provides about 7.14% of the total thickness of the laminate. Where desired, a "blank" insert may be inserted having a profile that fills the cavity 45 entirely, that is, with no side relief or defining passageways, thereby closing off one or both of the inlets 40 associated with the cavity 45.

One or more electric heater recesses 80 may be formed in the cartridge body 30 as required to receive rod type heat elements and maintain the flow temperature of the polymers. The side caps close the left and right sides of the cartridge body, with the inserts in place, and these are retained by screws 84 as shown in FIG. 3.

Precise adjustments may be made by opening the block 20 by removing one or both of the covers or caps 32 and 33 and replacing one or more of the inserts 60 with other inserts that provide different flow paths, in terms of thickness or flow area. However, it is an important feature of the invention that the flow paths defined on either side of the body of the insert 60 within the recesses 45, are of the same length and assuming the pressures and the flow rates are the same, the flow velocities at the joining region at the outlet 34 of the several layers are substantially the same, and the degree to which each layer of material is subjected to shear will be substantially the same as that of the other layers.

Figure 9:
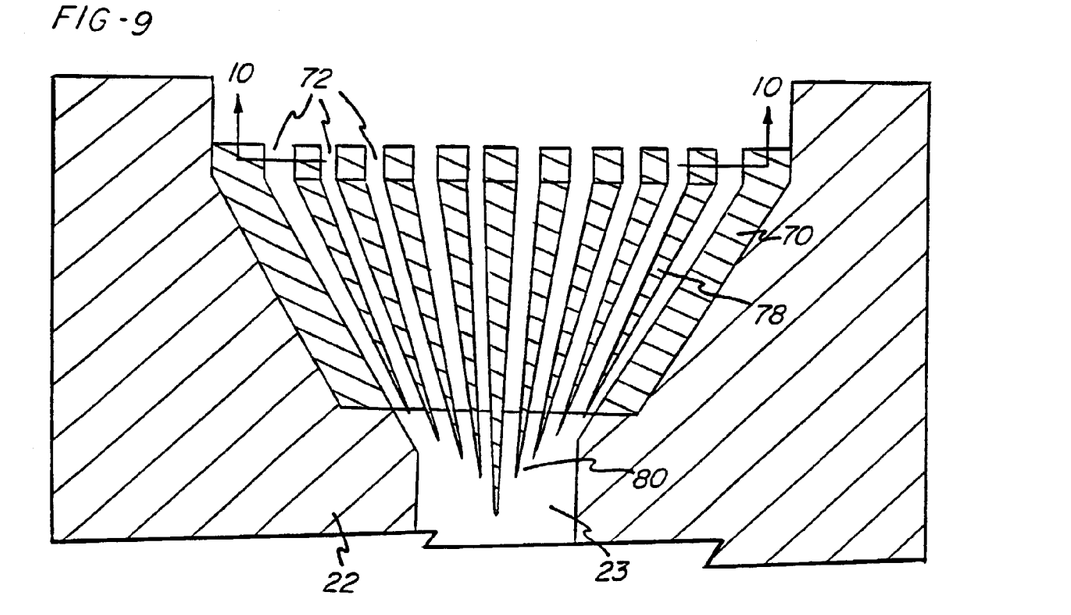
FIG. 9 is a sectional view of a combining adapter in which a plurality of individual flows are combined at a common region and in which the flow passages at the inlet to the combining adapter may be controlled in an effective way.
Figure 10:
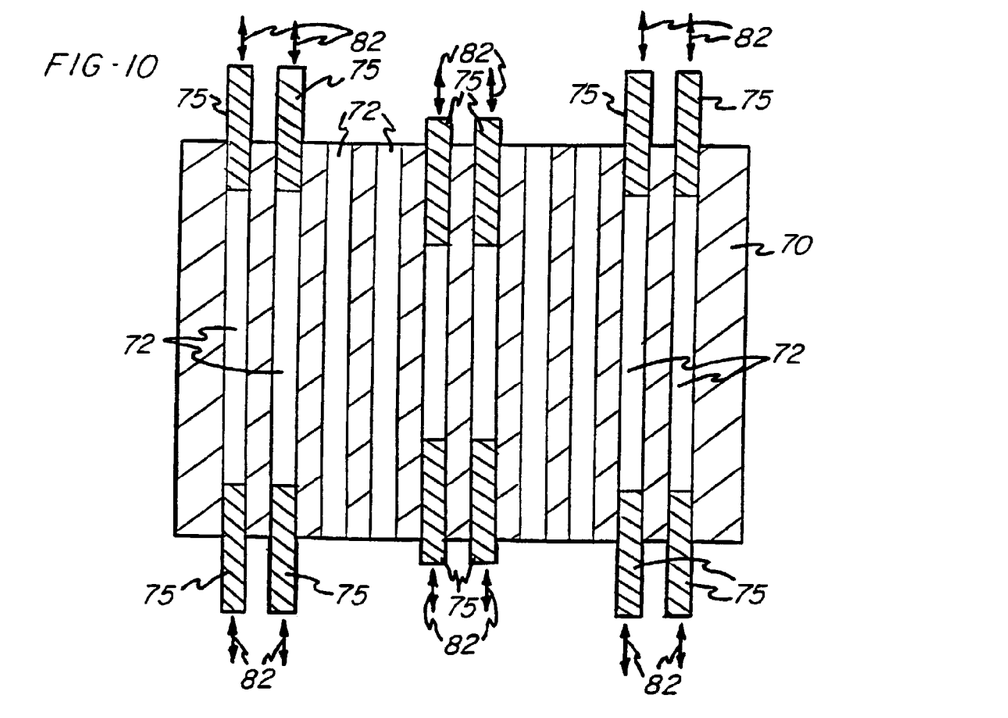
FIG. 10 is a sectional view taken generally along the line 10-10 of FIG. 9 showing mutually adjustable slide dividers positioned in the inlet slots leading to the combining adapter for individual and balanced adjustability of the width of the particular flow passage.

In a further aspect of the invention, as illustrated in FIGS. 9 and 10, provision is made by which the individual flow passages from the aspect ratio transitioning block, such as the block 14 in FIG. 1 are delivered to a novel flow combiner block 70 through a plurality of inlet passageways 72. At least some or all of the passageways 72 are controlled in width by pairs of mutually adjustable flow control divider blades 75, as best seen in FIG. 10. The blades 75 extend into the ends of the parallel passageways 72 and control the feed area of the respective passageway leading into the flow combining block 70.

The block 70 may be used in place of the block 20 in the description of the embodiments of FIGS. 1-8. However, the embodiment as shown in FIGS. 9 and 10 lacks the flexibility, convenience, and advantages of interchangeable divider cartridges 60. Rather, the flow combining adapter includes a plurality of flow defining walls, including intermediate dividers 78 leading to a common joining region 80.

However, the advantages of this embodiment may also be applied to the flow velocity profile adapter 20 and further advantages thereby realized.

The employment of pairs of moveable flow blocking blades 75 may be controlled, for example, to totally block off outside feed passageways to the flow combiner which may be opened, as desired, in cases where the die width increases, for the purpose of improving layer uniformity. Further, the blades 75 may be adjusted, in a very repeatable manner, moving toward or away from each other, either together or individually, as shown by the arrows 82, for the purpose of controlling a flow velocity in any one of the plurality of inlets 72 and thereby provides an adjustable flow combining cassette in which the width of one or more of the flow passages leading between the flow divider plates, may be adjusted. This creates the effect of preferentially promoting polymer flow of adjacent polymers towards the end of the die. Further, if desired, the combiner block 70 may be provided with dividers which are shaped, by shaping the intermediate defining walls or plates 78 for adjusting non-linear flow anomalies.

While FIG. 10 shows ten feed passageways in which blade pairs are provided in six of the passageways, it will be understood that this is for the purpose of illustration only, and fewer or greater number of blades 75 may be employed as desired.

What is claimed is:

1. A flow divider/combiner cassette comprising:
a body including a block having a plurality of insert-receiving cavities, said block defining an inlet end and an outlet end remote from said inlet end, each cavity of said insert-receiving cavities having at least a pair of polymer inlets for feeding polymer material into that cavity; and
removable inserts received in said insert-receiving cavities for dividing at least one of said insert-receiving cavities into at least a pair of flow passages associated with said pair of polymer inlets, each said cavity of said insert-receiving cavities being opened at said outlet end to define a combining region at which polymer layers flowing along said removable inserts are combined so as to provide control of flow velocities in said flow passages.

2. A flow divider/combiner cassette as recited in claim 1 in which said removable inserts are substantially identical to each other such that said flow passages that are substantially identical in length.

3. A flow divider/combiner cassette as recited in claim 1 in which said insert-receiving cavities are arranged in a generally fan-shaped array, said generally fan-shaped array being wider at said inlet end and converging about a central axis at said outlet end.

4. A flow divider/combiner cassette as recited in claim 1 in which said outlet end is received within an extruder die.

5. A flow divider/combiner cassette as recited in claim 1 in which said removable inserts are constructed and arranged to provide pre-detennined flow velocities through said flow passages.

6. A flow divider/combiner cassette as recited in claim 1, further comprising at least one blade extending into an end of at least one polymer inlet of at least one pair of polymer inlets for controlling an area of said at least one polymer inlet.

7. A flow divider/combiner cassette as recited in claim 1, wherein said pair of polymer inlets includes a first polymer inlet for feeding a first polymer and a second polymer inlet for feeding a second polymer, said first polymer differing from said second polymer.

8. A flow divider/combiner cassette as recited in claim 1, wherein said pair of polymer inlets includes a first polymer inlet for feeding a first polymer and a second polymer inlet for feeding a second polymer, said second polymer being the same as said first polymer.

9. A flow/divider combiner cassette comprising:
 a body including a block having a plurality of flow defining walls which define a plurality of passageways, said block defining an inlet end and an outlet end remote from said inlet end, each passageway having at least one polymer inlet for feeding polymer material into that passageway; and
 at least one blade extending into an end of at least a first of said passageways for controlling an area through which polymer can pass from at least one of said polymer inlets into said first passageway,
 wherein said passageways converge toward said outlet end, such that spaces between adjacent passageways taper from larger areas at said inlet end to smaller areas at said outlet end.

* * * * *

UNITED STATES PATENT AND TRADEMARK OFFICE
CERTIFICATE OF CORRECTION

PATENT NO.         : 7,296,992 B2                                            Page 1 of 1
APPLICATION NO. : 10/168842
DATED              : November 20, 2007
INVENTOR(S)        : Anton L. Timmons, Frederick C. Suppon and John S. Montalbano It is certified that error appears in the above-identified patent and that said Letters Patent is hereby corrected as shown below:

Title page, item [56] col. 2
*References Cited*, *U.S. Patent Documents*: please change "3,600,075" to --3,600,751--

*Column 6, line 63*: please change "pre-detennined" to --pre-determined--

Signed and Sealed this

Sixth Day of May, 2008

JON W. DUDAS
*Director of the United States Patent and Trademark Office*